United States Patent
Burke et al.

(10) Patent No.: US 11,625,872 B2
(45) Date of Patent: Apr. 11, 2023

(54) SYSTEM AND METHOD FOR REMOTE OBJECT TRIANGULATION

(71) Applicant: Booz Allen Hamilton Inc., McLean, VA (US)

(72) Inventors: Rory Burke, Arlington, VA (US); James J Ter Beest, III, Washington, DC (US)

(73) Assignee: BOOZ ALLEN HAMILTON INC., McLean, VA (US)

( * ) Notice: Subject to any disclaimer, the term of this patent is extended or adjusted under 35 U.S.C. 154(b) by 509 days.

(21) Appl. No.: 16/829,070

(22) Filed: Mar. 25, 2020

(65) Prior Publication Data

US 2022/0349704 A1 Nov. 3, 2022

(51) Int. Cl.

| | |
|---|---|
| *G06T 11/60* | (2006.01) |
| *G06F 17/16* | (2006.01) |
| *G06T 11/20* | (2006.01) |
| *G06V 20/13* | (2022.01) |
| *G01S 5/00* | (2006.01) |
| *G01B 11/00* | (2006.01) |

(52) U.S. Cl.
CPC ............ *G06T 11/60* (2013.01); *G01B 11/005* (2013.01); *G01S 5/0036* (2013.01); *G06F 17/16* (2013.01); *G06T 11/203* (2013.01); *G06V 20/13* (2022.01); *G06T 2207/10028* (2013.01)

(58) Field of Classification Search
CPC ........................................................ G06T 11/60
See application file for complete search history.

(56) References Cited

U.S. PATENT DOCUMENTS

| | | | |
|---|---|---|---|
| 2005/0058336 A1* | 3/2005 | Russell | ................... G06T 7/596 382/154 |
| 2019/0279390 A1* | 9/2019 | Zavesky | ................. G06F 3/011 |
| 2019/0353747 A1* | 11/2019 | Fowe | ................... G01S 5/0072 |

* cited by examiner

*Primary Examiner* — Shivang I Patel
(74) *Attorney, Agent, or Firm* — Buchanan Ingersoll & Rooney PC (57) ABSTRACT

An exemplary computing system for locating an object in an operational area is disclosed. The computing system having a server and plurality of edge devices. The edge devices having an image sensor configured to capture video data of the operational area from a specified location. The edge devices can process the video data to identify an object and generate a two-dimensional shape representative of the object, generate a vector from a lens of the image sensor through a center point of the two-dimensional shape; and determine relative position of the two-dimensional shape based on geospatial information of the edge device and the vector. The server and one or more of the edge devices receiving video data from a plurality of edge devices and generating a graphic, which defines a position of the object within the operational area based on the vector and location information of each edge device.

21 Claims, 7 Drawing Sheets

SYSTEM AND METHOD FOR REMOTE OBJECT TRIANGULATION

FIELD

The present disclosure relates to systems and methods for locating an object in an operational area.

BACKGROUND

It is often desirable to maintain situational awareness of a force protection area to mitigate hostile actions against military personnel, the general public, resources, facilities and critical infrastructure, such as a military base, airport, stadium, transit system, smart city, power plant or detention facility, and autonomously react to newly sensed information in these locations. In today's command and control environment, rapid reaction is necessary to quickly changing circumstances and newly acquired information.

Known techniques for tracking physical objects employ passive or active sensor observations that are used to calculate or report an object's physical location. At times, however, the physical object whose location is to be detected is a passive object that requires external observations using lasers, cameras, radar, sonar, induction sensors, infrared sensors, or other known sensors. Other times, even when the physical object includes the capability to derive and transmit its location, circumstances may arise where these capabilities are unavailable due to cost issues, interference by external environmental factors, or failures of onboard hardware or software.

SUMMARY

An exemplary computing device for locating an object in an operational area is disclosed. The device comprising: a receiving device connected to a network and configured to receive a plurality of data streams including image data generated by a plurality of edge devices connected to a network, the plurality of edge devices having different locations in the operational area, each data stream including at least a vector and a two-dimensional shape of an object according to a field of view of another edge device; a processing device configured to: generate a graphic of the operational area by extracting vector data and one or more attributes of each two dimensional shape of the object from the plurality of data streams; identify one or more vector pairs from the vector data and calculate a plurality of mutually-normal vector segments between one or more of the vector pairs; select one of the plurality of vector segments according to predetermined pattern recognition criteria associated with the detected object, wherein the selected vector segment is determined to have a midpoint at a center point of the composite two-dimensional shape of the object; and a display device configured to display the graphic of the operational area, wherein a position of the composite two-dimensional shape of the object within the operational area is determined by the selected vector segment.

An exemplary method for locating an object in an operational area is disclosed. The method comprising: receiving, in a receiving device of a computing system, a plurality of data streams including image data generated by a plurality of edge devices connected to a network, the plurality of edge devices having different locations in the operational area, each data stream including at least a vector and a two-dimensional shape of an object according to a field of view of a related edge device; extracting, in a processing device of the computing system, vector data and one or more attributes of each two dimensional shape of the object from the plurality of data streams; identifying, in the processing device of the computing system, one or more vector pairs from the vector data; calculating, in the processing device of a computing system, a plurality of mutually-normal vector segments between each vector pair; selecting, in the processing device of the computing system, one of the vector segments according to predetermined pattern recognition criteria associated with the object, wherein the selected vector segment is determined to have a midpoint at a center point of the composite two-dimensional shape of the object; and displaying, in a display device of the computing system, the graphic of the operational area, wherein a position of the composite two-dimensional shape of the object within the operational area is determined by the selected vector segment.

An exemplary method for determining a location of an object is disclosed. The method comprising: generating, via an image sensor of a first edge device, video data of an object from a first location in an operational area; detecting, via an image processor of the first edge device, an object in one or more frames of the video data; generating, via the image processor of the first edge device, a first two-dimensional shape based on one or more attributes of the detected object; generating, via the image processor of the first edge device, a first vector which extends from the image sensor through an estimated center point of the two-dimensional shape; receiving, via a receiving device of the first edge device over a network, one or more second vectors and one or more attributes of the detected object from a second edge device at a second location in the operational area, each second vector extending from an image sensor of the second edge device through an estimated center point of a second two-dimensional shape of the detected object; identifying one or more vector pairs among the first vector and the one or more second vectors; calculating, via the image processor of the first edge device, a plurality of mutually-normal vector segments between one or more of the vector pairs including; selecting, via the image processor of the first edge device, one of the plurality of vector segments according to predetermined pattern recognition criteria associated with the detected object, wherein the selected vector segment is determined to have a midpoint at a center point of the composite two-dimensional shape; and generating, via the image processor of the first edge device, a graphic of the operational area, the graphic including a composite two-dimensional shape of the object based on the vector data extracted from the first vector and the one or more second vectors and the one or more attributes of the first and second two-dimensional shapes, wherein a position of the composite two-dimensional shape of the object within the graphic of the operational area is determined by the selected vector segment.

An exemplary edge device in a network for locating an object in an operational area is disclosed. The device comprising: an image sensor configured to capture video data of an object from a specified location in an operational area; one or more processors configured to process the video data to identify an object and generate a two-dimensional shape representative of the object, generate a vector from a lens of the image sensor through a center point of the two-dimensional shape; and determine relative position of the two-dimensional shape based on geospatial information of the edge device and the vector; and a display device configured to display the video data with an overlay of the two-dimensional shape and the vector.

An exemplary system is disclosed, comprising: a plurality of image sensors configured to capture video data of an object from different locations in an operational area, each image sensor generating a data stream including one or more attributes and a vector representing positional information from a point on a related image sensor to at least a point on the object; and a processing server configured to: receive, over a network, the data streams from two or more of the image sensors and extract the one or more attributes and vector data; identify one or more vector pairs among the vector data extracted from the data streams; calculate a plurality of mutually-normal vector segments between one or more of the vector pairs; and select one of the plurality of vector segments according to predetermined pattern recognition criteria, wherein the selected vector segment is determined to have a midpoint at a true center point of the composite two-dimensional shape of the object; and generate a graphic display of the operational area, wherein a position of the composite two-dimensional shape of the object within the operational area is determined by the selected vector segment.

BRIEF DESCRIPTION OF THE DRAWINGS

Exemplary embodiments are best understood from the following detailed description when read in conjunction with the accompanying drawings. Included in the drawings are the following figures.

Further areas of applicability of the present disclosure will become apparent from the detailed description provided hereinafter. It should be understood that the detailed description of exemplary embodiments is intended for illustration purposes only and is, therefore, not intended to necessarily limit the scope of the disclosure.

DETAILED DESCRIPTION

Exemplary embodiments of the present disclosure are directed to systems and methods which use a plurality of distributed sensors at the edge of a network to determine a real-time or near-real time location of an object via the perspective views of the objects as observed by each of the plurality of the distributed sensors. Each sensor device can be configured to generate a vector as a two-dimensional polygon center line, which extends from the sensor to the object being observed. The vector extends in a direction substantially normal to the sensor such that a plurality of single-line vectors can be used to approximate the center point of the object closest to the compilation of all vectors.

Figure 1:
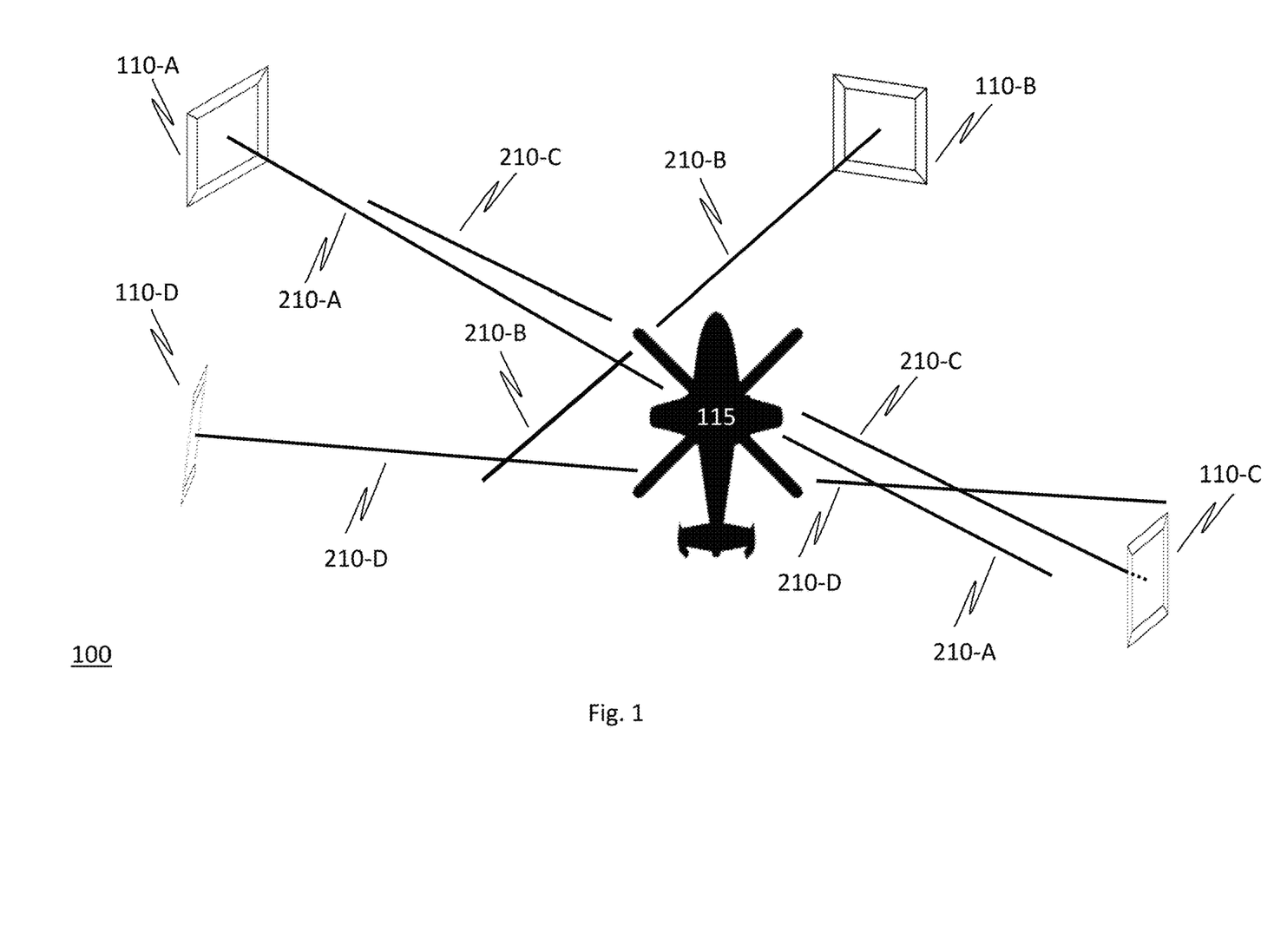
FIG. 1 illustrates a distributed network of edge sensors according to an exemplary embodiment of the present disclosure.

FIG. 1 illustrates a distributed network of edge sensors according to an exemplary embodiment of the present disclosure.

As shown in FIG. 1, a plurality of edge devices 110-A through 110-D can be deployed in an operational area 100. The operational area 100 can include a physical location associated with a geospatial coordinate or a location having an area bounded by a range of one or more geospatial coordinates. Each edge device 110 can be configured to detect and/or track one or more objects 115 as it moves within and/or through the operational area 100. According to an exemplary embodiment, each edge device 110 can be configured to have a stationary position in the operational area 100, such as being mounted to a static structure. According to another exemplary embodiment, the edge device 110 can be configured for dynamic positioning within the operational area 100, such that the edge device 110 can be attached to a user or integrated into a mobile or portable device or component. According to an exemplary embodiment of the present disclosure, each edge device 110 can be configured as a smartphone, body camera, tablet computing device, laptop computing device, or other portable device having a capacity to capture still or video images and communicate the captured images to a remote computing device such as another edge device or a server on a network. For locating one or more objects 115 in the operational area 100, each edge device 110 can be configured to generate a vector 210, such as a two-dimensional polygon center line, which extends from an image sensor 111 of the edge device 110 to the object 115 being observed. The vectors 210 extend in a direction substantially normal to the image sensor (e.g., a lens or aperture) 111 such that a plurality of single-line vectors can be used to approximate a center point of the object 115 as being closest to the compilation of all vectors 210.

Figure 2:
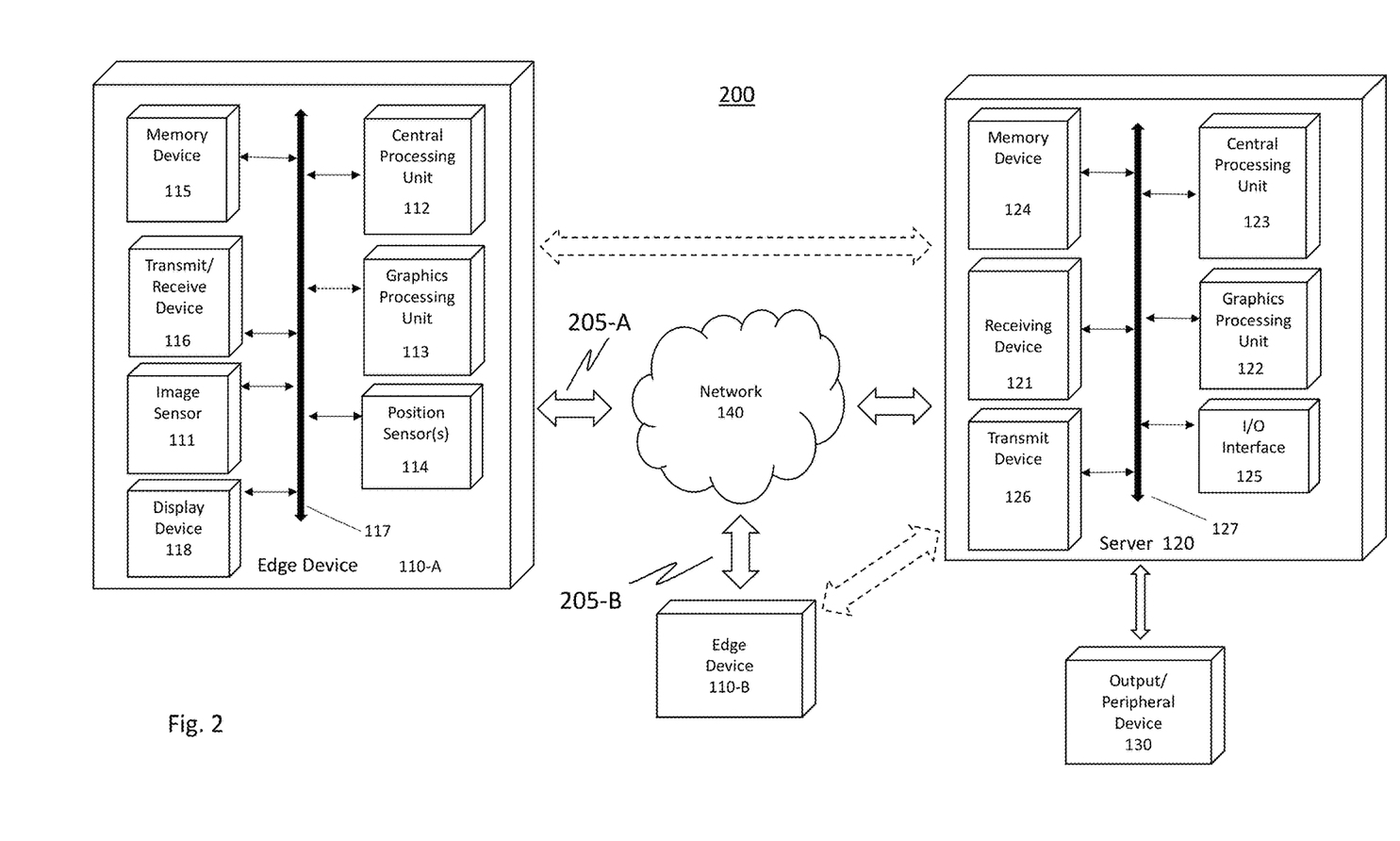
FIG. 2 illustrates a system for triangulating an object according to an exemplary embodiment of the present disclosure.

FIG. 2 illustrates a system for triangulating an object according to an exemplary embodiment of the present disclosure.

As shown in FIG. 2, the system 100 includes a plurality of edge devices 110 and one or more computing devices configured as server devices 120. As already discussed, the edge device 110 can include an image sensor 111 configured to capture video data from its location in the operational area according to its field of view. The field of view of includes the observable area that can be captured by an image sensor at any moment or segment in time. The image sensor 111 can include one or more lenses configured to capture still and/or video images. According to an exemplary embodiment, the image sensor 111 can be configured to capture images at a resolution in the range of 12 megapixels (MP), or any other suitable resolution as desired. The lenses can include any one or a combination of an ultra-wide angle lens, a wide angle lens, and a telephoto lens. The ultra-wide angle lens can include lenses having a viewing angle or field of view up to 180 degrees with a focal length shorter than 15 mm, for example. The wide angle lens can include lenses having, for example, a viewing angle or field of view between 64 degrees and 84 degrees and focal length shorter than 28 mm. The telephoto lens can includes lenses having, for example, a viewing angle or field of view within ranges of 30 to 10 degrees or 8 to 1 degree.

The edge device 110 can also include one or more processors configured to process the video data to identify an object and generate a two-dimensional shape representative of the object, generate a vector from a lens of the image sensor through a center point of the two-dimensional shape; and determine relative position of the two-dimensional shape based on geospatial information of the mobile device and the vector. For example, the edge device 110 can include a central processing unit (CPU) 112 and a graphics processing unit (GPU) 113. The central processing unit 112 can include a special purpose or a general purpose hardware processing device encoded with program code or software for scheduling and executing processing tasks associated with the overall operation of the edge device 110. The CPU 112 can be connected to a communications infrastructure 117 including a bus, message queue, network, multi-core message-passing scheme, etc, for communicating data and/or control signals with other hardware components of the edge device 110. According to an exemplary embodiment, the CPU 112 can include one or more processing devices such as a microprocessor, central processing unit, microcomputer, programmable logic unit or any other suitable hardware processing device as desired. The GPU 113 can include a combination of hardware and software components, such as a special purpose hardware processing device being configured to execute or access program code or software for rendering images in a frame buffer for display. For example, the GPU 113 can include an arithmetic logic unit, at least 128 KB of on-chip memory, and be configured with an application program interface such as Vulkan, OpenGL ES (Open Graphics Library for Embedded Systems), OpenVG (OpenVector Graphics), OpenCL (Open Computing Language), OpenGL (Open Graphics Library), Direct3D, or any other suitable hardware and/or software platform as desired.

According to an exemplary embodiment of the present disclosure, the GPU 113 can be configured to execute and/or access a neural network architecture for object recognition, the neural network architecture being trained to recognize one or more features of a plurality of objects including the detected object 115. For example, the neural network architecture can include a plurality of layers through which the GPU 113 can analyze one or more frames of each video signal to identify predetermined traits or features of a detected object as the image is passed through successive layers of the neural network. Based on the identified traits or features, the GPU 113 can identify and/or detect the object 115 to which the identified traits or features are associated.

The edge device 110 can also include one or more position sensors 114. The position sensors 114 can be configured to determine an absolute position of the edge device 110 and/or image sensor 111, in real-time or near real time using synchronized sensor data timestamps. In addition, the position sensor 114 can be configured to determine a spatial orientation of the edge device 110 and/or image sensor 111. For example, the position sensor 114 can include one or more of an accelerometer, a gyroscope, a magnetometer, global positioning system (GPS) hardware and software components, a barometer, and any other suitable sensor, circuitry, or technology for determining a physical position and/or orientation as desired. The GPU 113 can be configured to receive the position information from the edge device 110 via the communications infrastructure 117 and superimpose the position information onto the generated images. According to an exemplary embodiment, the position information can also include a timestamp, which may or may not be superimposed onto the image. The timestamp can also be used for data synchronization among the plurality of edge device. According to an exemplary embodiment, the position information can be attached to the generated image as metadata.

The edge device 110 can also include a memory device 115. The memory device 115 can be configured to store the image data generated by the GPU 113. The memory device 115 can include one or more memory devices such as volatile or non-volatile memory. For example, the volatile memory can include random access memory, read-only memory, etc. Based on the type of edge device 110 (e.g., laptop computer) deployed, the non-volatile memory of the memory device 115 can include one or more resident hardware components such as a hard disk drive and a removable storage drive (e.g., a floppy disk drive, a magnetic tape drive, an optical disk drive, a flash memory, or any other suitable device). The non-volatile memory can also or in the alternative include an external memory device connected to the edge device 110 via the network 140. Data stored in edge device 110 (e.g., in a non-volatile memory) may be stored on any type of suitable computer readable media, such as optical storage (e.g., a compact disc, digital versatile disc, Blu-ray disc, etc.) or magnetic tape storage (e.g., a hard disk drive). The stored data can include image data generated by the GPU 113, control and/or system data stored by the CPU 112, and software or program code used by the CPU 112 and/or GPU 113 for performing the tasks associated with the exemplary embodiments described herein. The data may be configured in any type of suitable database configuration, such as a relational database, a structured query language (SQL) database, a distributed database, an object database, etc. Suitable configurations and storage types will be apparent to persons having skill in the relevant art.

The transmit/receive device 116 can include a combination of hardware and software components for communicating with a remote computing device such as another edge device (e.g., 110-B) or server 120 or the network 140. The transmit/receive device 116 can be configured to transmit/receive data signals and/or data packets over the network 140 according to a specified communication protocol and data format. During a receive operation, the transmit/receive device 116 can identify parts of the received data via the header and parse the data signal and/or data packet into small frames (e.g., bytes, words) or segments for further processing by the CPU 112 or GPU 113. During a transmit operation, the transmit/receive device 116 can assemble data received from the CPU 112 or GPU 113 into a data signal and/or data packets according to the specified communication protocol and/or data format of the network 140 or receiving device. The transmit/receive device 116 can include one or more receiving devices and transmitting devices for providing data communication according to any of a number of communication protocols and data formats as desired. For example, the transmit/receive device 116 can be configured to communicate over the network 140, which may include a local area network (LAN), a wide area network (WAN), a wireless network (e.g., Wi-Fi), a mobile communication network, a satellite network, the Internet, optic fiber, coaxial cable, infrared, radio frequency (RF), or any combination thereof. Other suitable network types and configurations will be apparent to persons having skill in the relevant art. According to an exemplary embodiment, the transmit/receive device 116 can include any suitable hardware components such as an antenna, a network interface (e.g., an Ethernet card), a communications port, a PCMCIA slot and card, or any other suitable processing devices based on the type and configuration of the edge device 110.

The edge device 110 can include a display device 118 configured to display one or more interfaces and/or images generated by the CPU 112 and GPU 113. The video data can include an overlay of the two-dimensional shape and the vector as generated by the GPU 113. The GPU 113 can be configured to generate a data signal encoded with the video data and send the data signal to the display device 118 via the communications infrastructure 117. The display device 118 can include any one of various types of displays including light emitting diode (LED), micro-LED, organic LED (OLED), active-matrix organic LED (AMOLED), Super AMOLED, thin film transistor (TFT), TFT liquid crystal display (TFT LCD), in-plane switching (IPS), or any other suitable display type as desired. According to an exemplary embodiment, the display device 118 can be configured to have a resolution at any of 4K, 2K, high definition (HD), full HD, and a refresh rate including any one of 60 Hz, 90 Hz, 120 Hz or any other suitable resolution and refresh rate as desired.

The server 120 can include a receiving device 121, which is to receive a plurality of data streams including image data generated by a plurality of edge devices 110A-110D having different fields of view in the operational area. Each received data stream can include at least a vector 210A-210D and a two-dimensional shape of an object 115 detected according to a field of view of a respective edge device 110A-110D. The data stream can also include a timestamp, which as already discussed can be used to synchronize the data across the plurality of edge devices 110A-110D. For example, the server 120 can be configured to any of known synchronization protocol such as Timing-sync Protocol for Sensor Networks, Flooding Time Synchronization Protocol, or any other suitable synchronization algorithm or protocol as desired. As shown in FIG. 1, the fields of view of the plurality of mobile devices 110 can overlap as represented by the intersection of vectors 210 generated by two or more different edge devices 110. According to an exemplary embodiment, the vectors 210 can also be non-overlapping or non-intersecting, and have a parallel or skewed relationship relative to the positon of the associated edge device 110.

Figures 3A, 3B:
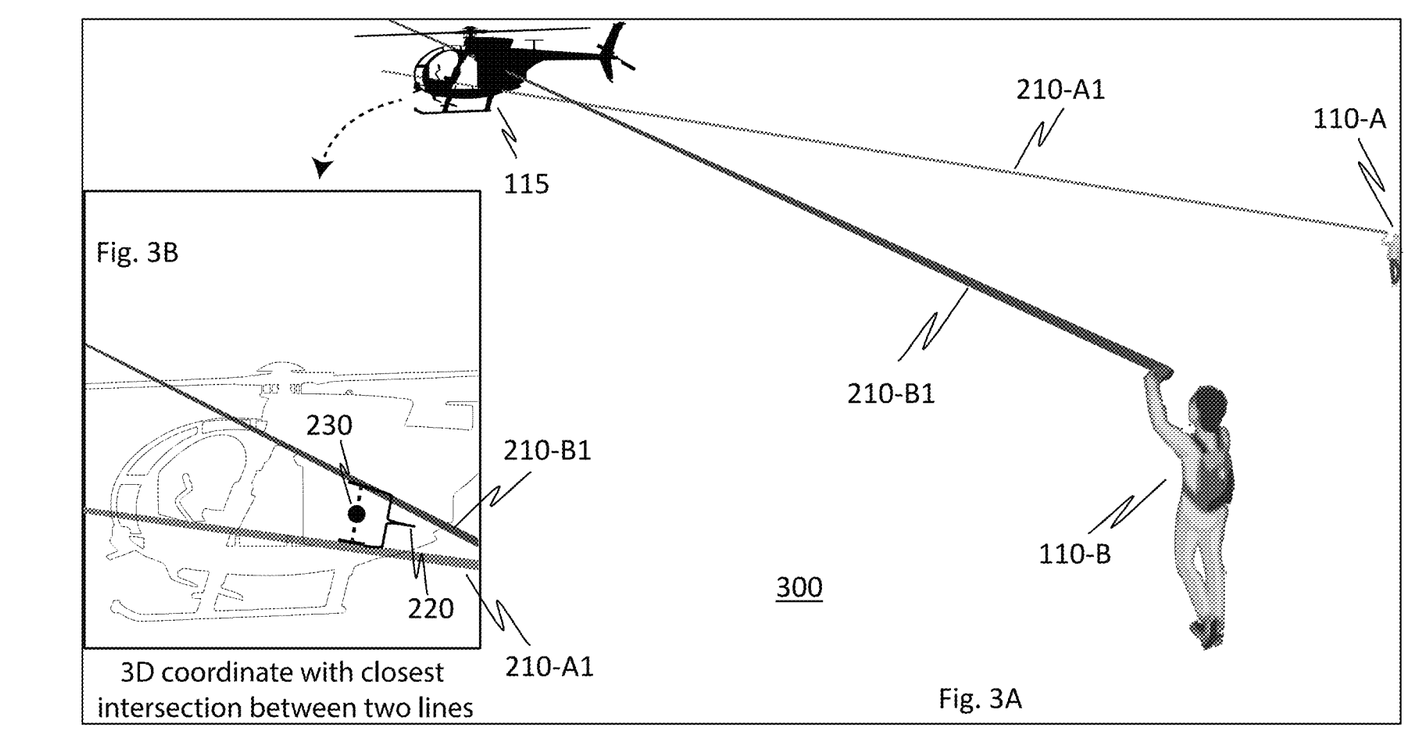
FIGS. 3A and 3B illustrate a first graphic of the operational area generated in accordance with an exemplary embodiment of the present disclosure.

The server 120 can also include GPU 122 can be configured to generate a real-time or near real-time graphic of the operational area 100. FIGS. 3A and 3B illustrate a first graphic of the operational area generated in accordance with an exemplary embodiment of the present disclosure. The graphic is determined using received data synchronized to a specified time instant and/or time range. As shown in FIG. 3, the graphic 300 can include a composite two-dimensional shape of the object 115. The GPU 122 can be configured to generate the object 115 from one or more attributes of each two dimensional shape of the object 115 in the plurality of data streams received from the edge devices 110 and the vector 210 included in each data stream. According to an exemplary embodiment, the object 115 can be represented by a plurality of adjacent, overlapping, and/or intersecting shapes, polygons, lines, and/or vertices of shapes or polygons. Each vector 210 extends from a representative location of a respective edge device 110 to a distance past the composite two-dimensional shape of an object 115. According to an exemplary embodiment, the vector 210 can extend from a point on the edge device 110 to at least a point on the object 115. The distance to which a vector 210 extends past the object 115 can be determined automatically by the GPU 122 or be a predetermined value set by a user, for example, via configuration of an application program interface (API). According to an exemplary embodiment of the present disclosure, the distance can be in a range of 3 m to 15 m, or any other suitable distance or range as desired. As shown in FIG. 3B, the GPU 122 can also be configured to calculate a plurality of mutually-normal vector segments 220 between vector pair 210-µl, 210-B1 and select one of the plurality of vector segments 220 according to predetermined pattern recognition criteria. The GPU 122 identifies a vector pair 210-X1, 210-Y1 as two of vectors 210-A to 210-D which intersect at a point on the composite two-dimensional shape of the object 115. According to an exemplary embodiment of the present disclosure, at least one vector pair 210-X1, 210-Y1 can include two of vectors 210-A to 210-D that are neither parallel nor intersecting, but are skewed (e.g., slanted) relative to one another. The selected vector segment 220 is determined to have a midpoint 230 at a center point of the composite two-dimensional shape 115.

The server 120 can include a CPU 123 which includes a special purpose or a general purpose hardware processing device encoded with program code or software for controlling the overall operation of the edge device 110 for performing the exemplary embodiments disclosed herein. The CPU 123 can be connected to a communications infrastructure 127 including a bus, message queue, network, multi-core message-passing scheme, etc. The CPU 123 can include one or more processing devices such as a microprocessor, microcomputer, programmable logic unit or any other suitable hardware processing device as desired. The server 120 can be configured to provide functionality for programs executed on one or more of the mobile devices 110. For example, the processing and/or generation of the graphic for each mobile device 110 can be centralized at the server 120 or can be shared among multiple mobile devices 110.

The server can also include a memory device 124 which is configured to store software and/or program code for execution by the GPU 122, the CPU 123, and one or more of the mobile devices 110. The memory device 124 can include one or more memory devices such as volatile or non-volatile memory. For example, the volatile memory can include random access memory, read-only memory, etc. The non-volatile memory can include a resident memory device such a hard disk drive and a removable storage drive (e.g., a floppy disk drive, a magnetic tape drive, an optical disk drive, a flash memory, or any other suitable device). The non-volatile memory can also or in the alternative include an external memory device connected to the computing device 102 via the I/O interface 126. Data stored in the server 120 (e.g., in a non-volatile memory) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The server 120 can include a transmit device 126 configured with a combination of hardware and software components for assembling data received from the CPU 123 or GPU 122 into a data signal and/or data packets according to the specified communication protocol and/or data format of the network 140 or receiving device. The transmit device 126 can include one or more receiving devices and transmitting devices for providing data communication according to any of a number of communication protocols and data formats as desired. For example, the transmit device 126 can be configured to communicate over the network 140, which may include a local area network (LAN), a wide area network (WAN), a wireless network (e.g., Wi-Fi), a mobile communication network, a satellite network, the Internet, fiber optics, coaxial cable, infrared, radio frequency (RF), or any combination thereof. Other suitable network types and configurations will be apparent to persons having skill in the relevant art. According to an exemplary embodiment, the transmit device 126 can include any suitable hardware components such as an antenna, a network interface (e.g., an Ethernet card), a communications port, a PCMCIA slot and card, or any other suitable processing devices as desired.

The output/peripheral device 130 is configured to output the data signal in a format selected by a user. For example, the output device 130 can be implemented as a display device, printer, speaker, or any suitable output device with a desired output format as desired. According to an exemplary embodiment, the output device 130 can include or connected to receive date from the server 120 via an input/output (I/O) interface 125. The I/O interface 125 can include a combination of hardware and software components and be configured to convert the output of the server 120 into a format suitable for output on one or more output/peripheral devices 130. For example, the I/O interface 125 can be configured to format a data signal encoded with data generated by the GPU 122 for displaying a graphic of the operational area 100 on an output/peripheral device 130 configures as a display device.

Figures 4A, 4B, 4C:
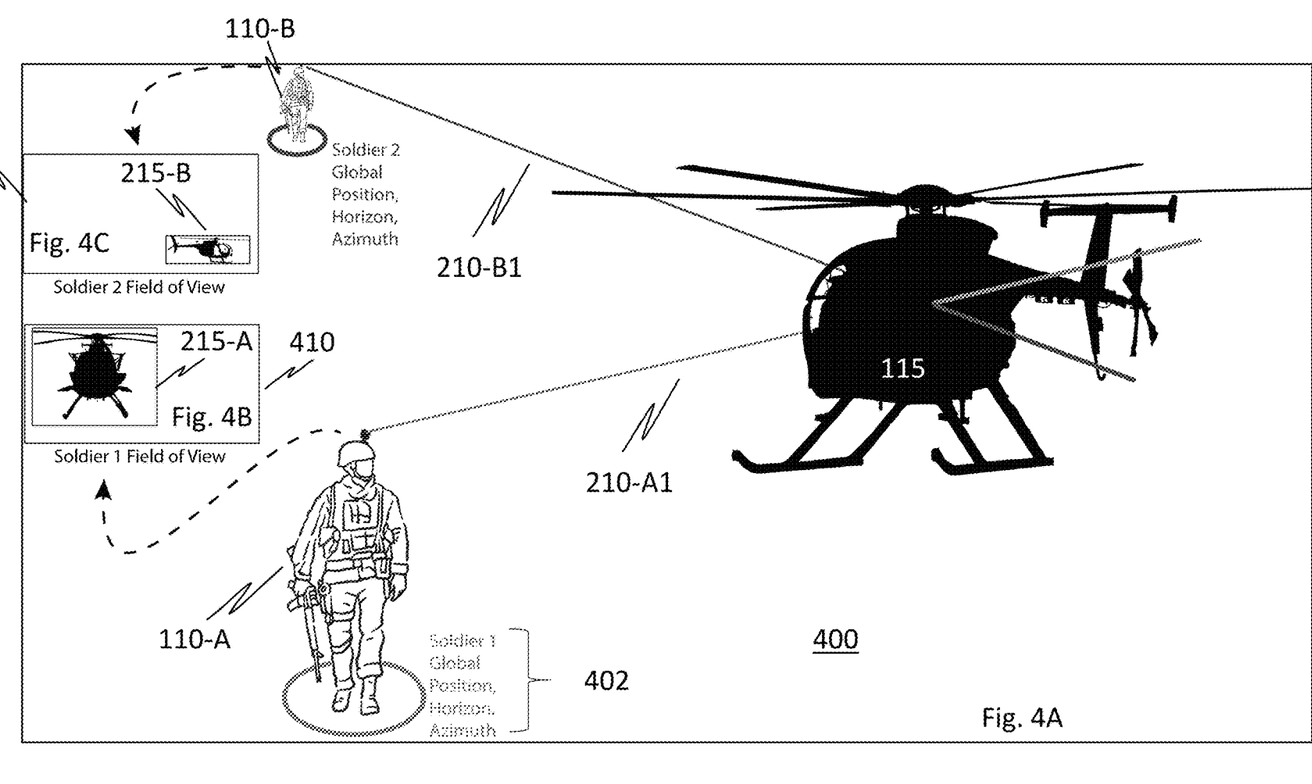
FIGS. 4A, 4B, and 4C illustrate a second graphic of the operational area generated in accordance with an exemplary embodiment of the present disclosure.

FIGS. 4A, 4B, and 4C illustrate a second graphic of the operational area generated in accordance with an exemplary embodiment of the present disclosure. As shown in FIG. 4A, the GPU 112, 122 can generate a graphic 400 based on the vector 210 included in each data stream received from the edge devices 110 in the operational area 100. The graphic 400 can include position and identification information 402 of the mobile device 110 and/or associated user. The GPU 112, 122 can be configured to generate perspective views of each edge device 110 based on the data stream generated by an edge device 110, a data stream received from an edge device 110, or a combination of the two. For example, FIG. 4B illustrates a graphic 410 based on a data stream generated by the edge device 110—of FIG. 4A. The graphic 410 includes a perspective view of the two-dimensional shape of the object 115 based on the physical position of the mobile device 110-A in the operational area 100. FIG. 4C illustrates a graphic 420 based on a data stream generated by the mobile device 110-B in FIG. 4A. Similar to FIG. 4b, the graphic 420 illustrates a perspective view of the two-dimensional shape of the object 115 based on the physical position of the mobile device 110-B in the operational area 100.

Figure 5:
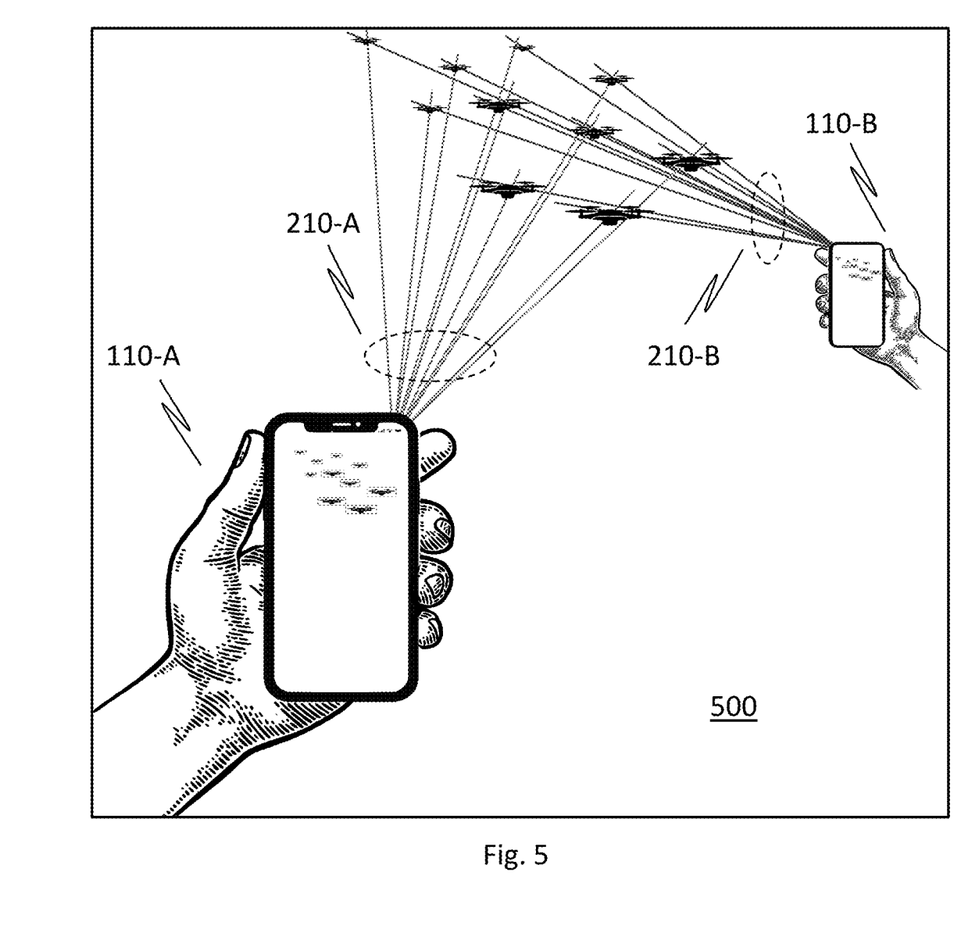
FIG. 5 illustrates a location detection of a plurality of objects according to an exemplary embodiment of the present disclosure.

FIG. 5 illustrates a location detection of a plurality of objects according to an exemplary embodiment of the present disclosure.

As shown in FIG. 5, each edge device 110 can be configured to simultaneously track and/or detect plural objects in an operational area 500. That is, for edge device 110-A, for example, the image sensor 111 can capture a plurality of objects 115 from its location within the operational area 500 and according to its field of view. The GPU 112 of an edge device 110 can be configured to detect each object 115, identify each object 115 by performing an image recognition analysis on the image data. The GPU 112 can generate a two-dimensional shape representative of the object 115 based on the image recognition analysis. The two-dimensional shape being formed from a plurality of adjacent or overlapping shapes, polygons, or lines, or any combination thereof. The GPU 112 also uses positional data of the edge device 110 to generate a vector 210 from a point on the image sensor 111 (e.g., a lens or aperture) to at least a point on the object 115. For example, the GPU 112 can generate a vector that extends in a direction that is substantially normal to the surface of the lens or aperture of the image sensor 111, through an estimated point of the two-dimensional shape or object 115. According to an exemplary embodiment of the present disclosure, the estimated point can be a center point or any other suitable point on the object 115 as desired. The GPU 112 can obtain position information of the edge device 110 from the one or more position sensors 114 and determine relative position of each two-dimensional shape 115 based on geospatial information of the edge device 110 and each vector 210.

Figure 6:
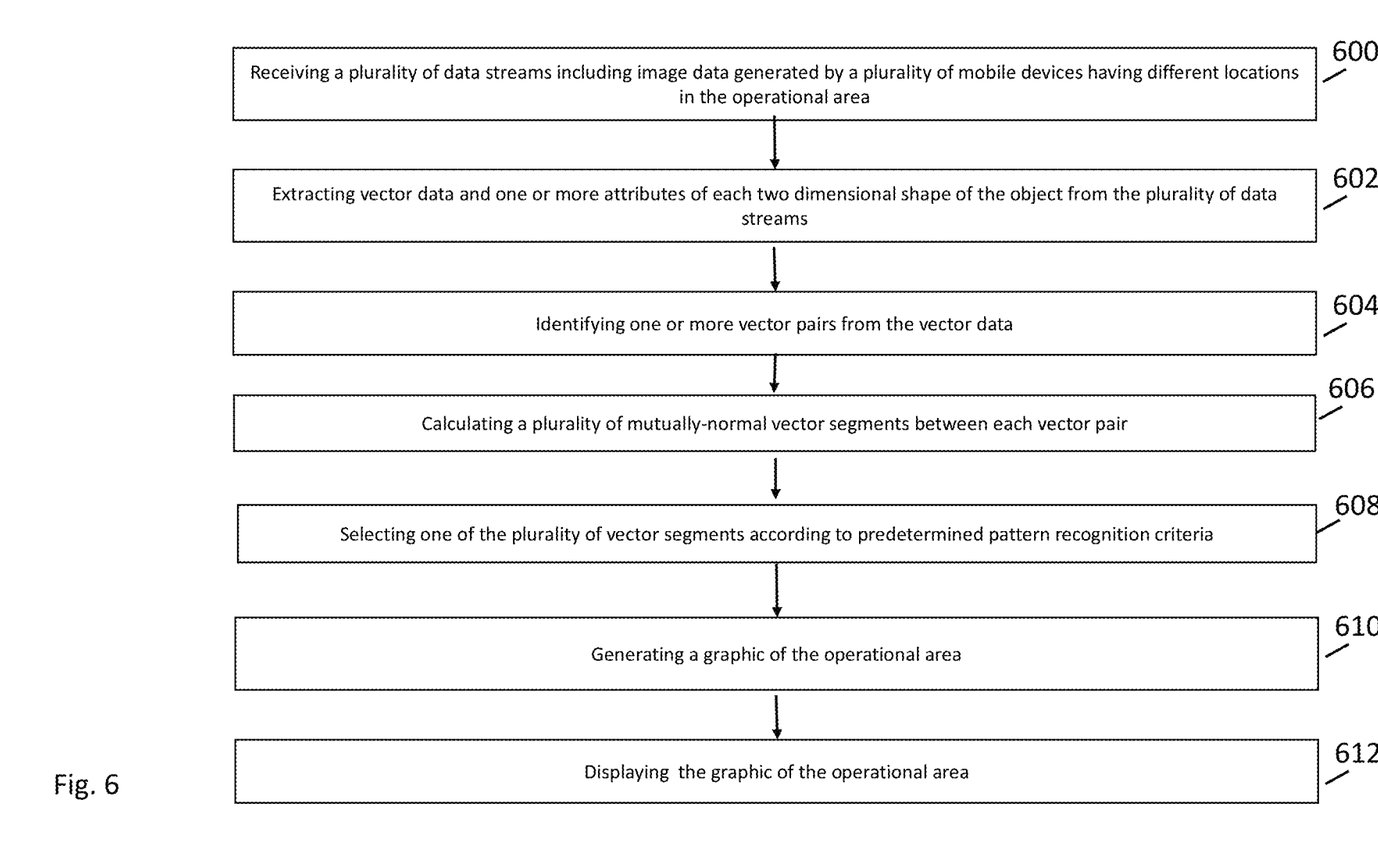
FIG. 6 illustrates a first method for locating an object in an operational area according to an exemplary embodiment of the present disclosure.

FIG. 6 illustrates a first method for locating an object in an operational area according to an exemplary embodiment of the present disclosure.

The server 120 is configured to perform the method for locating an object in an operational area based on software and programming code executed by a combination of the GPU 122 and CPU 123. The method includes receiving, in the receiving device 121 of the server 120, a plurality of data streams including image data generated by a plurality of edge devices 110 at different locations within the operational area 100 and according to different fields of view (Step 600). Each data stream 205 includes at least a vector 210 and a two-dimensional shape of an object 115 detected according to the field of view of a respective edge device 110. The server 120 can be configured to synchronize the data streams and extract vector data and one or more attributes of the two-dimensional shapes of the object 115 from two or more of the data streams 205-A, 205-B (Step 602). The server 120 can perform an image recognition analysis based on the one or more extracted attributes to identify the object or type of object. Each vector 210 extends from a representative location of a respective edge device 110 to a distance past the composite two-dimensional shape of an object 100. The method at the server 120 further includes identifying one or more vector pairs from the vector data extracted from the plural data streams (Step 604). The server 120 can then calculate a plurality of mutually-normal vector segments 220 between vector pairs 210-A1, 210-B1 (Step 606). The server 120 selects one of the plurality of vector segments 220 according to a predetermined pattern recognition criteria, where the selected vector segment represents an estimated center- or mid-point of the composite two-dimensional shape 215 of the detected object 115 (Step 608). The predetermined pattern recognition criteria includes feature data that is associated with the one or more attributes of the object 115 extracted from the plural data streams. The feature data corresponding to physical specifications of the object as provided from industry, manufacturer, or other known or standard setting sources. For example, the feature data can include the dimensions of: a fuselage on an aircraft, frame or door of a car, dimensions of the hull of a boat, or any other specifications for identifying and/or sizing features of a detected object as desired.

Once the vector segment is selected, the server 120 generates a real-time or near real-time graphic 300, 400 of the operational area 100 (Step 610). The graphic 300, 400 including a composite two-dimensional shape of the object 100 based on the one or more attributes of each two dimensional shape of the object 100 in the plurality of data streams 205-A, 205-B and each vector 210 in the plurality of data streams 205-A, 205-B. The position of the composite two-dimensional shape 215 of the object 115 within the operational area is determined by the selected vector segment. The server displays the graphic 300, 400 of the operational area 100 (Step 612).

Figure 7:
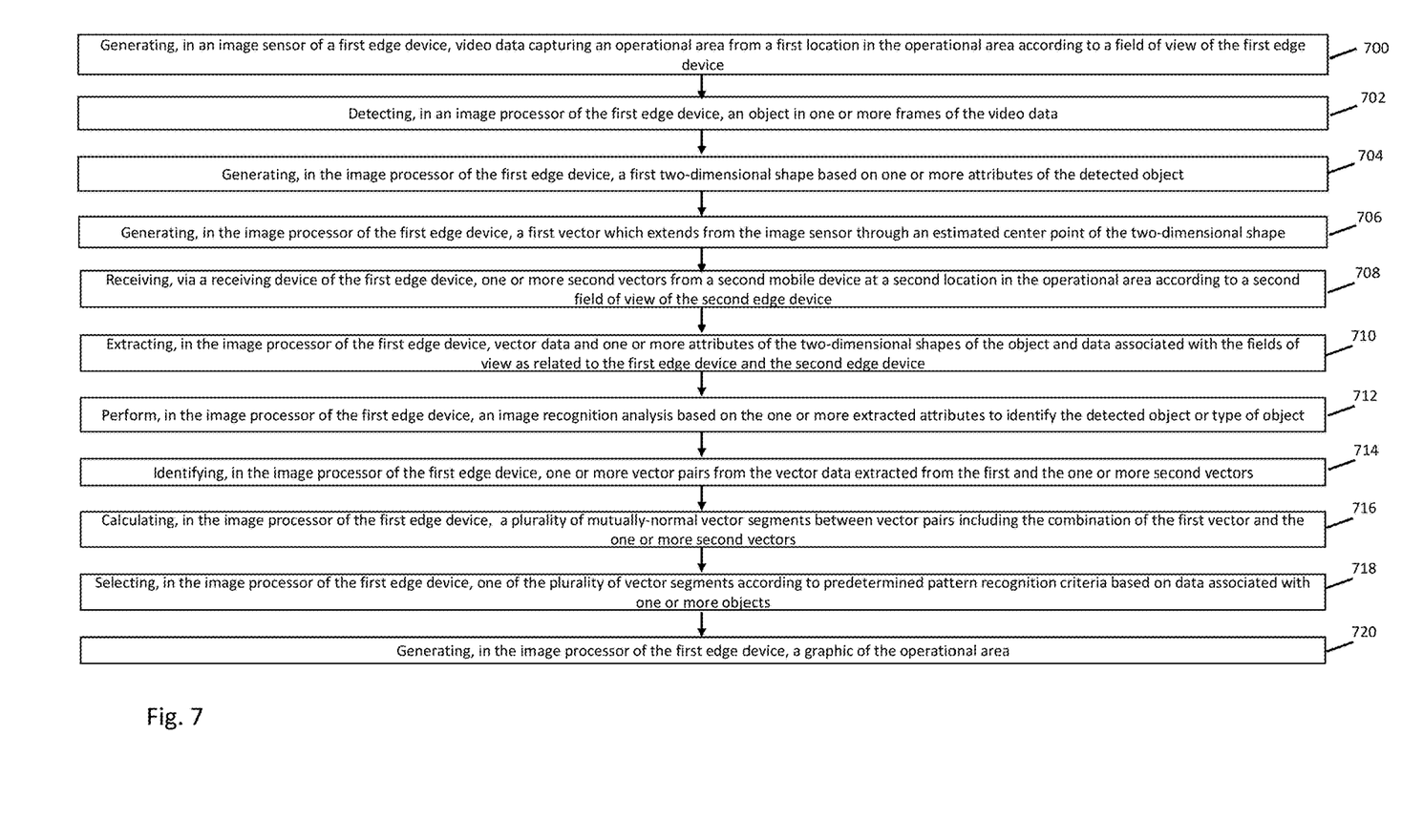
FIG. 7 illustrates a second method for locating an object in an operational area using a plurality of mobile devices according to an exemplary embodiment of the present disclosure.

FIG. 7 illustrates a second method for locating an object in an operational area having a plurality of edge devices according to an exemplary embodiment of the present disclosure.

The method includes generating, via an image sensor 111 of a first mobile device 110, video data capturing an operational area 100 from a first location in the operational area and according to first field of view (Step 700). The first edge device 110 includes a GPU 113 which detects an object 115 in one or more frames of the video data (Step 702). The first edge device 110-A generates a first two-dimensional shape 215-A based on one or more attributes of the detected object 115 (Step 704). The first edge device further generates a first vector 210-A which extends from the image sensor 111 at least up to and/or through an estimated center point of the two-dimensional shape 115 (Step 706). The method further includes receiving, via a receiving device 116 of the first mobile device 110-A, one or more second vectors 210-B from a second edge device 110-B at a second location in the operational area and according to a second field of view (Step 708). Each second vector 210-B extends from an image sensor 111 of the second edge device 110-B at least up to and/or through an estimated center point of a second two-dimensional shape of the detected object 115.

The first edge device 110-A can extract vector data and one or more attributes of the two-dimensional shapes of the object 115 and data associated with the fields of view related to the first edge device 110-A and the second edge device 110-B (Step 710). The first edge device 110-A can perform an image recognition analysis based on the one or more extracted attributes to identify the detected object or type of object (Step 712). The method further includes the first edge device 110-A identifying one or more vector pairs from the vector data extracted from the first and the one or more second vectors 210-A, 210-B (Step 714). The first edge device 110-A calculates a plurality of mutually-normal vector segments 220 between vector pairs including the combination of the first vector 210-A1 and the one or more second vectors 210-B1 (Step 716). The first edge device 110-A then selects one of the plurality of vector segments 220 according to predetermined pattern recognition criteria based on data associated with one or more objects 115 (Step 718). The selected vector segment 220 is estimated to have a midpoint at a center point of the composite two-dimensional shape 115.

The first edge device 110-A generates a graphic 400 of the operational area 100 (Step 720). The graphic 400 including a composite two-dimensional shape of the object 115, the first vector 210-A1, and the one or more second vectors 210-B1. The composite two-dimensional shape is based on one or more attributes of the first and second two-dimensional shapes 215-A, 215-B and its position in the operational area is determined by the selected vector segment 220.

The computer program code for performing the specialized functions described herein can be stored on a medium and computer usable medium, which may refer to memories, such as the memory devices for both the server 120 and edge devices 110, which can be memory semiconductors (e.g., DRAMs, etc.). These computer program products can be a tangible non-transitory means for providing software to the various hardware components of the respective devices as needed for performing the tasks associated with the exemplary embodiments described herein. The computer programs (e.g., computer control logic) or software can be stored in the memory device. According to an exemplary embodiment, the computer programs can also be received and/or remotely accessed via the receiving device 116, 121 of the edge devices 110 and server 120 as needed. Such computer programs, when executed, can enable the server 120 and edge device 110 to implement the present methods and exemplary embodiments discussed herein. Accordingly, such computer programs may represent controllers of the server 120 and edge devices 110. Where the present disclosure is implemented using software, the software can be stored in a non-transitory computer readable medium and loaded into the computing system 100 using a removable storage drive, an interface, a hard disk drive, or communications interface, etc., where applicable.

The one or more processors of the server 120 and the edge or mobile devices 110 can include one or more modules or engines configured to perform the functions of the exemplary embodiments described herein. Each of the modules or engines can be implemented using hardware and, in some instances, can also utilize software, such as program code and/or programs stored in memory. In such instances, program code may be compiled by the respective processors (e.g., by a compiling module or engine) prior to execution. For example, the program code can be source code written in a programming language that is translated into a lower level language, such as assembly language or machine code, for execution by the one or more processors and/or any additional hardware components. The process of compiling can include the use of lexical analysis, preprocessing, parsing, semantic analysis, syntax-directed translation, code generation, code optimization, and any other techniques that may be suitable for translation of program code into a lower level language suitable for controlling the server 120 or edge device 110 to perform the functions disclosed herein. It will be apparent to persons having skill in the relevant art that such processes result in the server 120 and/or edge device 110 being specially configured computing devices uniquely programmed to perform the functions discussed above.

It will be appreciated by those skilled in the art that the present invention can be embodied in other specific forms without departing from the spirit or essential characteristics thereof. The presently disclosed embodiments are therefore considered in all respects to be illustrative and not restrictive. The scope of the invention is indicated by the appended claims rather than the foregoing description and all changes that come within the meaning, range, and equivalence thereof are intended to be embraced therein.

What is claimed is:

1. A computing device for locating an object in an operational area, the device comprising:
    a receiving device connected to a network and configured to receive a plurality of data streams including image data generated by a plurality of edge devices connected to a network, the plurality of edge devices having different locations in the operational area, each data stream including at least a vector and a two-dimensional shape of an object according to a field of view of a related edge device, the vector in each data stream extending from a focal point of an image sensor of the related edge device a camera to at least a point on the two-dimensional shape;
    a processing device configured to:
    generate a graphic of the operational area by extracting, from each data stream, vector data associated with the vector and one or more attributes of the two dimensional shape of the object;

identify one or more vector pairs from the vector data and calculate a plurality of mutually-normal vector segments between one or more of the vector pairs;

select one of the plurality of vector segments according to predetermined pattern recognition criteria associated with the detected object, wherein the selected vector segment is determined to have a midpoint at a center point of the composite two-dimensional shape of the object; and a display device configured to display the graphic of the operational area, wherein a position of the composite two-dimensional shape of the object within the operational area is determined by the selected vector segment.

2. The computing device of claim 1, wherein two or more fields of view of the plurality of edge devices are overlapping.

3. The computing device of claim 2, wherein each vector extends from a center of a camera lens of a respective edge device to a distance past the composite two-dimensional shape.

4. The computing device of claim 2, wherein at least one of the vector pairs includes vectors that are neither parallel nor intersecting.

5. The computing device of claim 1, wherein the processing device is further configured to identify the object based on the one or more extracted attributes, and the predetermined pattern recognition criteria includes feature data associated with the one or more extracted attributes of the identified object.

6. A method for locating an object in an operational area, the method comprising:

receiving, in a receiving device of a computing system, a plurality of data streams including image data generated by a plurality of edge devices connected to a network, the plurality of edge devices having different locations in the operational area, each data stream including at least a vector and a two-dimensional shape of an object according to a field of view of a related edge device, the vector in each data stream extending from a focal point of an image sensor of the related edge device a camera to at least a point on the two-dimensional shape;

extracting from each data stream, in a processing device of the computing system, vector data associated with the vector and one or more attributes of each two dimensional shape of the object;

identifying, in the processing device of the computing system, one or more vector pairs from the vector data;

calculating, in the processing device of a computing system, a plurality of mutually-normal vector segments between each vector pair;

selecting, in the processing device of the computing system, one of the vector segments according to predetermined pattern recognition criteria associated with the object, wherein the selected vector segment is determined to have a midpoint at a center point of the composite two-dimensional shape of the object; and displaying, in a display device of the computing system, the graphic of the operational area, wherein a position of the composite two-dimensional shape of the object within the operational area is determined by the selected vector segment.

7. A method for determining a location of an object, the method comprising:

generating, via an image sensor of a first edge device, video data of an object from a first location in an operational area;

detecting, via an image processor of the first edge device, an object in one or more frames of the video data;

generating, via the image processor of the first edge device, a first two-dimensional shape based on one or more attributes of the detected object;

generating, via the image processor of the first edge device, a first vector which extends from a focal point of the image sensor through at least an estimated center point of the two-dimensional shape;

receiving, via a receiving device of the first edge device over a network, one or more second vectors and one or more attributes of the detected object from a second edge device at a second location in the operational area, each second vector extending from an image sensor of the second edge device through an estimated center point of a second two-dimensional shape of the detected object;

identifying one or more vector pairs among the first vector and the one or more second vectors;

calculating, via the image processor of the first edge device, a plurality of mutually-normal vector segments between one or more of the vector pairs including;

selecting, via the image processor of the first edge device, one of the plurality of vector segments according to predetermined pattern recognition criteria associated with the detected object, wherein the selected vector segment is determined to have a midpoint at a center point of the composite two-dimensional shape; and generating, via the image processor of the first edge device, a graphic of the operational area, the graphic including a composite two-dimensional shape of the object based on the vector data extracted from the first vector and the one or more second vectors and the one or more attributes of the first and second two-dimensional shapes, wherein a position of the composite two-dimensional shape of the object within the graphic of the operational area is determined by the selected vector segment.

8. The method of claim 7, wherein the one or more identified attributes are predetermined attributes of the detected object.

9. The method of claim 7, wherein the image processor of the first edge device is encoded with neural network architecture trained for object recognition, the method comprising:

identifying, via the image processor of the first edge device, the predetermined attributes of the detected object by training the neural network architecture to recognize one or more features of at least the detected object.

10. The method of claim 9, comprising:

identifying, via the image processor of the first edge device, predetermined attributes of the operational area by training the neural network architecture with image data for recognizing features within the operational area.

11. The method of claim 7, wherein generating the two-dimensional shape comprises:

demarcating a portion of the one or more video frames with the two dimensional shape of the detected object, wherein the two-dimensional shape includes the one or more identified attributes.

12. The method of claim 11, comprising:
assigning, via the image processor of the first edge device, geospatial information to the two-dimensional shape, wherein the geospatial information specifies a location of the first edge device.

13. The method of claim 7, wherein the first vector extends from a center of a camera lens of the image sensor to a distance past the two-dimensional shape according to a field of view of the first edge device.

14. The method of claim 7, comprising:
generating a composite two-dimensional shape formed of at least one of a plurality of polygons and a plurality of vertices derived from the two-dimensional shapes associated with the fields of view of the first and second edge devices.

15. The method of claim 13, wherein the locations of each edge device are associated with different fields of view, and the fields of view of the first and second edge devices overlap.

16. The method of claim 15, wherein each of the first vector and the one or more second vectors extend from a center of a camera lens of a respective image sensor to a distance past the composite two-dimensional shape.

17. The method of claim 15, comprising:
receiving, in the receiving device of the first image sensor, the one or more second vectors as a stream of data.

18. The method of claim 17, wherein the vectors in the vector pair extend in a skewed relationship relative to each other.

19. An edge device in a network for locating an object in an operational area, the device comprising:
an image sensor configured to capture video data of an object from a specified location in an operational area;
one or more processors configured to process the video data to identify an object and generate a two-dimensional shape representative of the object, generate a vector from a lens focal point of the image sensor through at least a center point of the two-dimensional shape, and determine relative position of the two-dimensional shape based on geospatial information of the edge device and the vector; and
a display device configured to display the video data with an overlay of the two-dimensional shape and the vector.

20. The edge device of claim 19, wherein the one or more processors is encoded with neural network architecture for object recognition, the neural network architecture being trained the neural network architecture to recognize one or more features of a plurality of objects including the detected object.

21. A system comprising:
a plurality of image sensors configured to capture video data of an object from different locations in an operational area, each image sensor generating a data stream including one or more attributes and a vector representing positional information from a focal point on a related image sensor to at least a point on the object; and
a processing server configured to:
receive, over a network, the data streams from two or more of the image sensors and extract the one or more attributes and vector data from each data stream;
identify one or more vector pairs among the vector data extracted from the data streams;
calculate a plurality of mutually-normal vector segments between one or more of the vector pairs; and
select one of the plurality of vector segments according to predetermined pattern recognition criteria, wherein the selected vector segment is determined to have a midpoint at a true center point of the composite two-dimensional shape of the object; and
generate a graphic display of the operational area, wherein a position of the composite two-dimensional shape of the object within the operational area is determined by the selected vector segment.

\* \* \* \* \*